US009576501B2

(12) United States Patent
Seki

(10) Patent No.: US 9,576,501 B2
(45) Date of Patent: Feb. 21, 2017

(54) PROVIDING SOUND AS ORIGINATING FROM LOCATION OF DISPLAY AT WHICH CORRESPONDING TEXT IS PRESENTED

(71) Applicant: LENOVO (SINGAPORE) PTE. LTD., New Tech Park (SG)

(72) Inventor: Lucio Mitsuru Seki, Sorocaba-SP (BR)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 27 days.

(21) Appl. No.: 14/645,906

(22) Filed: Mar. 12, 2015

(65) Prior Publication Data
US 2016/0267812 A1 Sep. 15, 2016

(51) Int. Cl.
G10L 13/00 (2006.01)
G09B 21/00 (2006.01)
H04S 7/00 (2006.01)
G10L 13/02 (2013.01)

(52) U.S. Cl.
CPC ............ *G09B 21/006* (2013.01); *G10L 13/02* (2013.01); *H04S 7/30* (2013.01); *G10L 13/00* (2013.01); *H04S 2400/15* (2013.01)

(58) Field of Classification Search
CPC .......... G10L 13/06; G10L 19/02; G10L 21/10; G10L 25/18; G06F 3/04842; G06F 3/16; G06F 3/167; G06F 3/165; H04M 1/72547; H04M 3/4938; H04M 3/5166; H04N 13/0296; H04S 7/302; G11B 19/025
USPC .......... 740/258, 270, 2, 217, 233, 235, 254, 262,740/266, 275, 3; 381/61, 56, 17, 18, 300; 715/209, 210, 727
See application file for complete search history.

(56) References Cited

U.S. PATENT DOCUMENTS

| | | | | |
|---|---|---|---|---|
| 5,473,759 A | * | 12/1995 | Slaney | G10L 19/02 704/217 |
| 5,724,410 A | * | 3/1998 | Parvulescu | G08B 3/1033 340/313 |
| 5,801,679 A | * | 9/1998 | McCain | G06F 3/04842 715/723 |
| 5,900,005 A | * | 5/1999 | Saito | G06F 3/04842 704/3 |
| 5,950,167 A | * | 9/1999 | Yaker | G06F 3/16 704/270 |
| 6,144,358 A | * | 11/2000 | Narayanaswamy | G06F 1/1616 345/102 |

(Continued)

FOREIGN PATENT DOCUMENTS

EP 0788723 B1 * 5/2000 ............. H04S 7/302

OTHER PUBLICATIONS

Dmitry N. Zotkin, Ramani Duraiswami, Larry S. Davis, "Rendering Localized Spatial Audio in a Virtual Auditory Space" 2004 University of Maryland Institute for Advanced Computer Studies http://www.umiacs.umd.edu/~ramani/pubs/ZDD_cvs.pdf.

(Continued)

Primary Examiner — Vijay B Chawan
(74) Attorney, Agent, or Firm — John L. Rogitz; John M. Rogitz

(57) ABSTRACT

In one aspect, a device includes a processor, a display accessible to the processor, and memory accessible to the processor. The memory bears instructions executable by the processor to provide sound corresponding to a portion of text presented on the display with at least one portion of the sound being provided as if originating at least substantially from a location on the display at which the portion of text is presented on the display.

20 Claims, 4 Drawing Sheets

(56) References Cited

U.S. PATENT DOCUMENTS

| | | | |
|---|---|---|---|
| 6,230,197 B1* | 5/2001 | Beck | G06Q 10/06 379/265.09 |
| 2002/0147586 A1* | 10/2002 | Belrose | G11B 19/025 704/233 |
| 2002/0150256 A1* | 10/2002 | Belrose | G11B 19/025 381/17 |
| 2003/0095668 A1* | 5/2003 | Wilcock | G11B 19/025 381/56 |
| 2003/0095669 A1* | 5/2003 | Belrose | G11B 19/025 381/56 |
| 2003/0227476 A1* | 12/2003 | Wilcock | G11B 19/025 715/727 |
| 2008/0091428 A1* | 4/2008 | Bellegarda | G10L 13/06 704/254 |
| 2009/0237654 A1* | 9/2009 | LeBlanc | G01B 11/306 356/239.7 |
| 2013/0041648 A1* | 2/2013 | Osman | H04S 7/302 704/2 |
| 2013/0158993 A1* | 6/2013 | Wilcock | G06F 3/167 704/235 |

OTHER PUBLICATIONS

Stephen A. Brewster, "Using Non-Speech Sounds to Provide Navigation Cues" Glasgow Interactive Systems Group Department of Computing Science, Sep. 1998, http://www.dcs.gla.ac.uk/~stephen/papers/TOCHI98.pdf.

Christos Tsakostas, Andreas Floros, "Optimized Binaural Modeling for Immersive Audio Applications" Audio Engineering Society Convention Paper 7100 Presented at 122nd Convention May 5-8, 2007.

Wikipedia, "Binaural Recording", printed Feb. 11, 2015 http://en.wikipedia.org/wiki/binaural_recording.

Wikipedia, "Binaural Beats", printed Feb. 11, 2015, http://en.wikiedia.org/wiki/binaural_beats.

Wikipedia, "Sound Localization", printed Feb. 11, 2015, http://en.wikipedia.org/wiki/Sound_localization.

Wikipedia, "Internaural Time Difference", printed Feb. 11, 2015, http://en.wikipedia.org/wiki/Interaural_time_difference.

Wikipedia, "Critical Band", printed Feb. 11, 2015, http://en.wikipedia.org/wiki/Critical_band.

\* cited by examiner

PROVIDING SOUND AS ORIGINATING FROM LOCATION OF DISPLAY AT WHICH CORRESPONDING TEXT IS PRESENTED

FIELD

The present application relates generally to providing sound, as originating from, a location of a display at which corresponding text is presented.

BACKGROUND

Users of electronic devices, such as the visually impaired, use text to speech technology to audibly render text presented on a display. However, the audio is typically rendered without an indication of which portion of the display is presenting the corresponding text. The visually impaired user thus has an inadequate, if any, understanding of the layout of the text that is being presented audibly, how much text is left to be audibly rendered, how much of the total text has already been audibly rendered, etc. This may be particularly problematic if the visually impaired user is e.g. a computer programmer trying to manipulate code presented on a display which is also being audibly rendered, with the user desiring to know the location in the code as presented on the display to which the audible rendering corresponds to e.g. select that display area to perform an edit of the code.

SUMMARY

Accordingly, in one aspect a device includes a processor, a display accessible to the processor, and memory accessible to the processor. The memory bears instructions executable by the processor to provide sound corresponding to a portion of text presented on the display with at least one portion of the sound being provided as if originating at least substantially from a location on the display at which the portion of text is presented on the display.

In another aspect, a method includes presenting text on a display of a device, and presenting sound signals corresponding to respective portions of the text as coming from respective areas of the display at which the respective portions of the text are presented.

In still another aspect, an apparatus includes a first processor, a network adapter, and storage bearing instructions executable by a second processor for providing audio corresponding to a portion, of text presented on a display accessible to the second processor, with at least a portion of the audio being provided to give the impression it originates at least from, a direction at least corresponding to an edge of the display closest to a location of the display at which the portion of the text is presented on the display. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
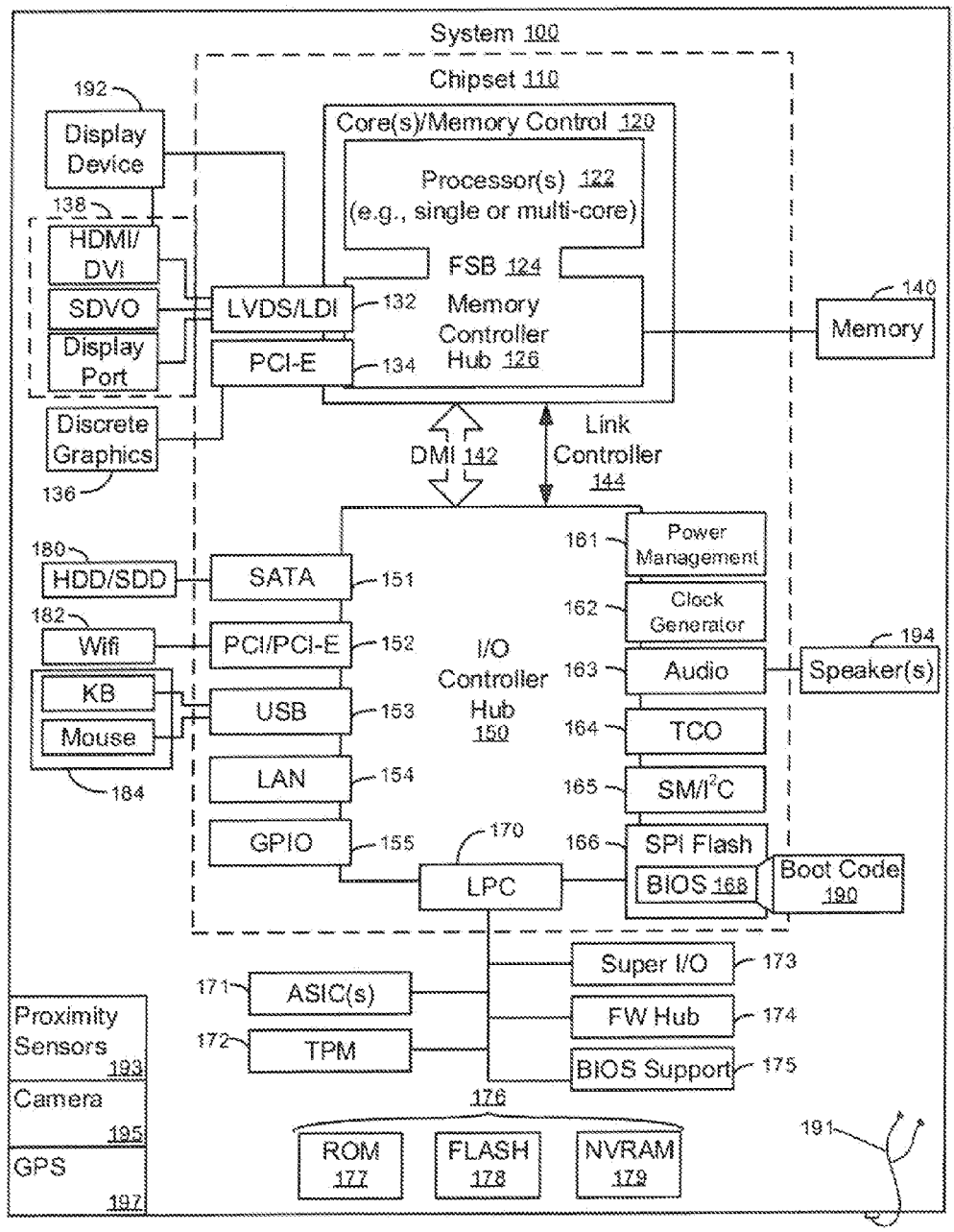
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, 8, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise, "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown is FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system, may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio such as binaural sound in accordance with present principles), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Furthermore, the system 100 may include head phones and/or ear buds 191, with each bud comprising a speaker for providing sound in accordance with present principles. The system 100 may also include proximity, motion, infrared, sonar, and/or heat sensors 193 providing input to the processor 122 and configured in accordance with present principles for sensing e.g. proximity of one or more persona (e.g. to the system 100), motion of one or more persons, body heat of one or more persons, etc. Also note that at least one camera 195 may be included on the system 100 for gathering one or more images and providing input related thereto to the processor 122 so that e.g. the processor 122 may use such input to identify the location and/or proximity of a user in accordance with present principles. The camera 195 may be, e.g., a thermal imaging camera, a digital camera such as a webcam, a three-dimensional (3D) camera, and/or a camera integrated into the system 100 and controllable by the processor 122 to gather pictures/images and/or video. Still further, it may be appreciated from FIG. 1 that, the system 100 may include a GPS transceiver 197 that is configured to e.g. receive geographic position information from at least one satellite and provide the information, to the processor 122 and/or communicate geographic position information of the system 100 to another device (e.g. where the system 100 is a wearable device and thus identifies the location of a person when, wearing it). However, it is to be understood that another suitable position receiver other than a GPS receiver may be used in accordance with present principles to e.g. determine the location of the system 100.

Additionally, though now shown for clarity, in some embodiments the system 100 may also include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, and an audio receiver/microphone providing input to the processor 122 e.g. based on a user providing audible input to the microphone.

Figure 2:
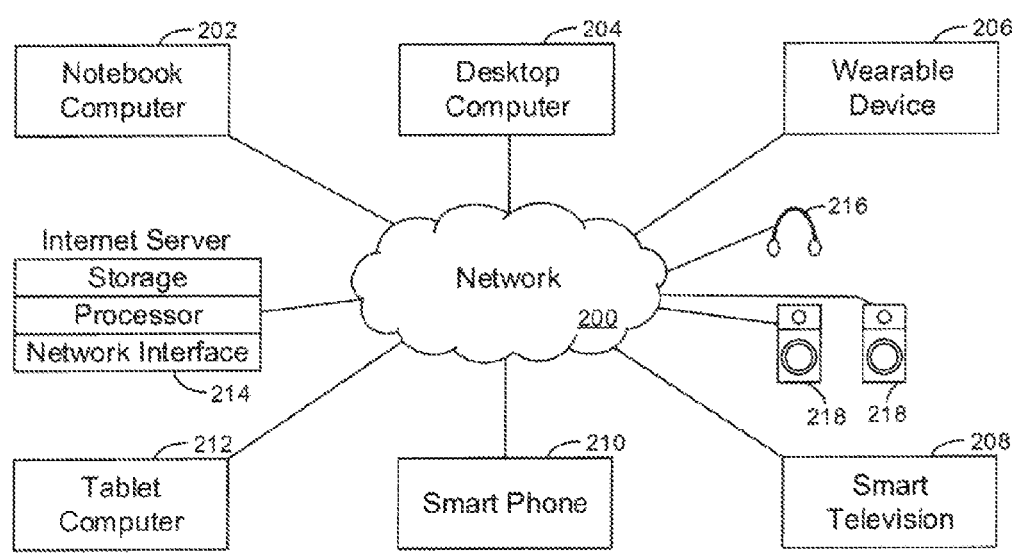
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 (e.g. comprising plural speakers for providing binaural sound in accordance with presence principles) such as e.g. a smart, watch, a smart television (TV) 208, a smart phone 210, a tablet computer 212, a set or pair of headphones and/or ear buds 216 (e.g. comprising plural speakers, one for each ear), plural e.g. stand-alone speakers 218 for providing binaural sound in accordance with present principles (such as, relative to a user facing the speakers, an upper left speaker, an upper right speaker, a lower left speaker, and a lower right speaker), and a server 214 such as e.g. an Internet server that may e.g. provide cloud storage accessible to the devices 202-212, 216, and 218. It is to be understood that the devices 202-218 are configured to communicate with each other over the network 200 to undertake present principles.

Figure 3:
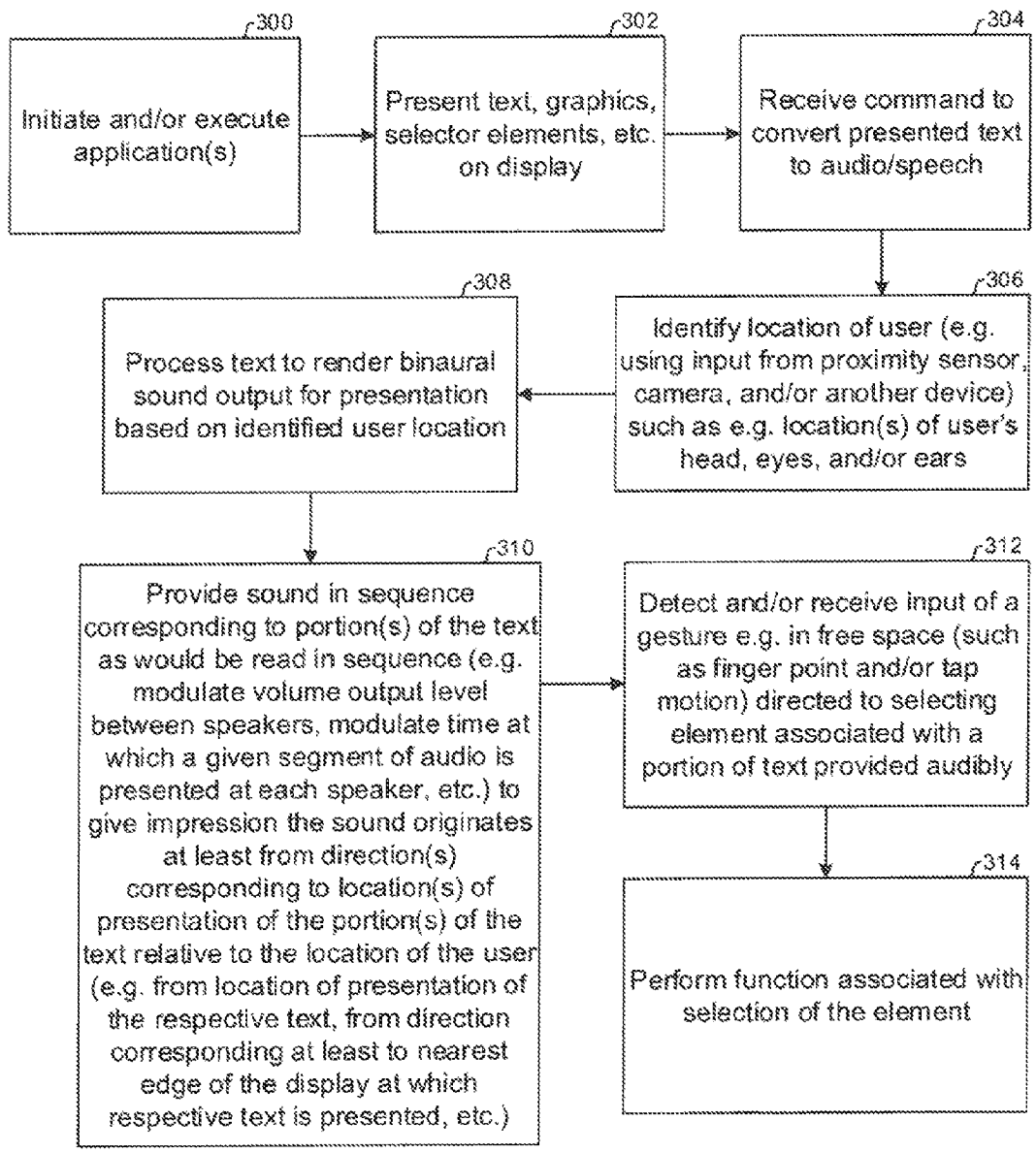
FIG. 3 is a flow chart showing an example algorithm in accordance with present principles.

Referring to FIG. 3, it shows example logic that may be undertaken by a device such as the system 100 in accordance with, present principles (referred to below as the "present device"). Beginning at block 300, the logic initiates and/or executes one or more applications for undertaking present principles, such as e.g. a proximity detection application, a text to speech application, a monaural to binaural sound conversion application, a gesture recognition application, a single application integrating one or more of the foregoing, etc. From block 300 the logic of FIG. 3 moves to block 302, where the logic presents information and/or data on a display accessible to the present device, such as e.g. text, graphics, selector elements (e.g. icons, buttons, hyperlinks, tiles, files, etc.). Thereafter, the logic proceeds to block 304.

At block 304 the logic (e.g. optionally) receives a command to convert at least some of the text presented at block 302 to audio and/or speech. The logic then proceeds to block 306, where the logic identifies a location of a user of the present device such as e.g. the location of the user's head, eyes, and/or ears specifically. The location of the user may be identified based on input from one or more of e.g. a proximity sensor accessible to the present device, a camera accessible to the present device, another device accessible to the present device, a GPS transceiver on a device being worn by the user which is accessible to the present device, etc.

Responsive to identification of the location, the logic may then proceed to block 308, where the logic processes at least a portion of the text presented on the display to render and/or generate therefrom binaural sound and/or otherwise processed sound output and/or signals for presentation on plural speakers based on the location of the user, where the output corresponds to the portion of the text (e.g. a text-to-speech conversion).

From block 308 the logic moves to block 310, where the logic provides sound, and/or the sound output to plural speakers (e.g. respectively in left and right ear buds of head phones, at two speakers of the present device, on two speakers in communication with the present device, etc.) for presentation thereon. It is to be understood that in example embodiments, words contained in and/or spoken (e.g. by a computerized voice) as part of the sound output may be presented in a sequence matching the sequence of the words of the portion of the text itself as intended to be read. For example, if the text is in the English language, the text itself would be read top to bottom, left to right, and thus the sound output would be presented according to the same sequence.

Still in reference to block 310, it is to be understood that the sound may not only be provided in sequence but also to give the impression to the user that respective portions of the sound that are provided using the speakers originate at least from respective directions, relative to the user (e.g. the user's head), at which the text is presented on the display. E.g., the sound output when provided over the speakers may have its volume output level modulated between the speakers, have its frequency modulated as presented on the speakers, and/or have its time at which a given segment of the sound is presented on the modulated between the speakers (e.g. providing the same segment/portion of sound spaced slightly temporally apart at the speakers (e.g. in the critical band) to give the impression that the sound is coming from the left of, or the right of, the user) to accordingly give the impression that respective portions thereof originate at least from directions at which the text is presented on the display. Thus, it is to be understood that in at least some embodiments, plural speakers may be used that are respectively disposed above and to the right of the user, below and to the right of the user, above and to the left of the user, and below and to the left of the user, with the front of the speakers which provide the sound establishing planes which are, e.g., parallel with a plane established by the display.

Accordingly, the respective portions of the sound output may be provided using the speakers to give the impression it originates at least from respective directions at which the text is presented in that, for example, the presented sound may be modulated to give the impression that it originates at least substantially from a particular location of the display (e.g. a point or area in three dimensions) at which the text is presented, such as e.g. from the particular location specifically or at least from within a threshold of the location as can be best provided based on the sound output capabilities of the speakers being used and/or the binaural sound rendering capabilities for a given environment.

What's more, and also expounding on what was indicated above, in some embodiments the respective portions of the sound output may be modulated to e.g. give the impression that the sound portions originate, if not from the actual location of the corresponding text as presented on the display, at least from a direction corresponding at least to at least one edge of the display which is a nearest edge to the location at which the corresponding text is presented on the display, and optionally e.g. the two nearest orthogonal edges to the display location. E.g., if the text is presented on an upper half of the display, and based on its position is also presented on a left half of the display (e.g. presented in an upper left quadrant), the sound may be provided to give the impression is originates at least from an upper left direction relative to the user feeing forward based on the left and upper edges of the display being the closest orthogonal edges to the location of where the text itself is presented to thus at least partially establish the direction of sound origin. As another example using the upper left corner again, the sound that is provided may even be provided in an exaggerated form to make it seem that the sound originated from beyond the area established by the plane of the front of the display itself (e.g. far up and to the left, like the top corner of a room in which the display is disposed), but where the exaggerated direction is still based on the upper and left edges being the nearest orthogonal, to blatantly convey that the location of the text itself corresponding to the sound portion is in an upper left portion of the display.

Continuing the detailed description of FIG. 3, after block 310 the logic may optionally proceed to block 312. At block 312, the logic may detect and/or receive user input of a gesture (e.g. in free space, against a surface of a desk, etc.) based on input from a camera in communication with the present device (e.g. gathering images of the user performing the gesture), a proximity sensor in communication with the present device, etc. It is to be understood that the gesture when detected and/or received at block 312 is identified as being directed to a selector element presented on the display that is associated with a portion of text that has been provided audibly as set forth herein.

For example, a submit button may include the text "submit" thereon, which was "read" aloud by the device using binaural sound as originating from the location of where the submit button is presented, and hence a visually impaired person may determine where the button is presented on the display based at least in part on the provided sound. The user may then direct a gesture such as a finger point and/or a tapping motion at least generally in the direction of where the submit button is presented (e.g. within a threshold angle of directly at it as established by the orientation of the tip of the finger being pointed). The device may recognize this gesture (e.g. in some embodiments, only if provided within a threshold time of the text of the button being audibly provided) as selection of the element, and thus at block 314 may perform a function associated with selection of the element.

Figure 4:
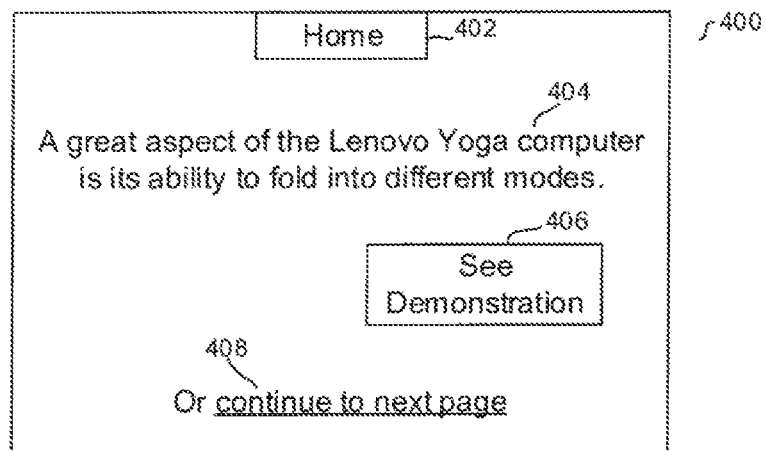
FIGS. 4 and 5 are example user interlaces (UIs) in accordance with present principles.

Continuing now in reference to FIG. 4, it shows an example user interface (UI) 400 presentable on a display of a device such as a device undertaking the logic of FIG. 3, and/or the system 100. Note that the UI 400 includes a home button 402 selectable (e.g. using a gesture as described above) to cause a home screen of the device to be presented, and also includes the text "home" which maybe audibly rendered as set forth herein. The UI 400 also includes an area 404 at which other text is presented.

Accordingly, a device undertaking present principles may provide binaural sound which has been converted from respective words of the text shown in the area 404 to thus provide the impression that the respective words, when audibly provided, have sound origins corresponding to the locations of the respective words as presented on the display. Note that the first line of the text in the area 404 is indented. Thus, e.g., the first word "A" may be audibly provided as if the sound originated from where the word "A" is presented at the indentation of the first line. The rest of the text shown may also be rendered audibly as if the respective audio versions of the words originated from the respective display locations of the words. Accordingly, from top to bottom, left to right the text as converted into binaural sound may be audibly presented using at least two speakers in the sequence "A great aspect of the Lenovo Yoga computer is its ability to fold into different modes."

Providing a few additional examples of the audible rendering of words in that sequence, when the word "Lenovo" is audibly provided using binaural sound, it is provided to manic the sound as coming from the location of the display presenting the word "Lenovo", or in some embodiments, at least as coming from a left portion (e.g. left half) of the display and/or an area to the left of the display offscreen (e.g. when the sound output is exaggerated). When the word "modes" is audibly provided using binaural sound, it is provided to mimic the sound as coming from the location of the display presenting the word "modes" (e.g. so that it seems the audio corresponding to the word "modes" is to the right of and below the source of sound for the word "Lenovo"), or in some embodiments, at least as coming from a right portion of the display and/or an area to the right of the display offscreen (e.g. when the sound output is exaggerated).

Still in reference to FIG. 4, a selector element 406 is also presented on the UI 400, and includes the text "see demonstration". When this text is audibly rendered at speakers to give the impression that the audio originates from the bottom right portion of the UI 400 where it is presented (e.g. and in some embodiments, within a threshold time of being audibly rendered), a gesture may be detected by the device as being directed to the element 406 for selection of the element. Thus, responsive to receipt of the gesture, the device may, in this case, launch a demonstration video of how the Lenovo Yoga computer folds into different modes.

Also note that the UI 400 includes a hyperlink selector element 408, the text of which may be provided audibly as disclosed herein. The element 408 may also be selected e.g. based on detection of gesture input.

Figure 5:
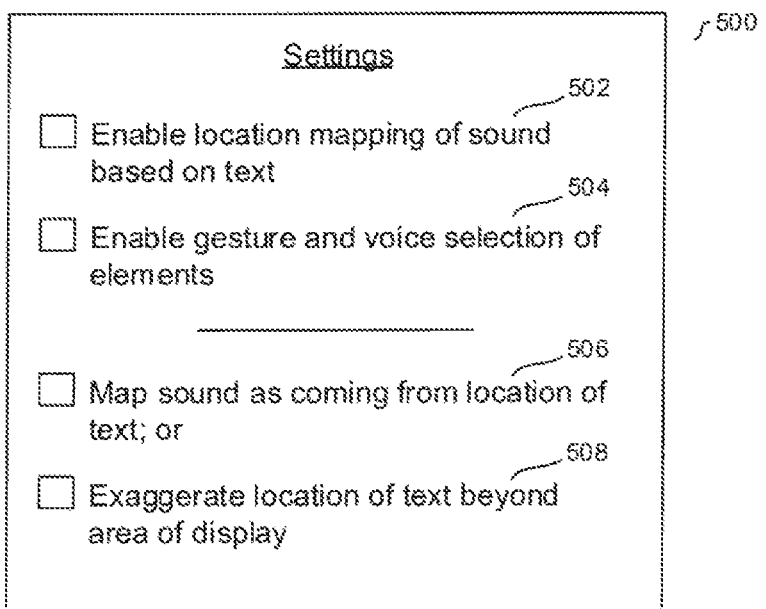

Before moving on to the description of FIG. 5, it is to be understood that in some embodiments, in addition to providing sound corresponding to the text presented on a given selector element such as the elements 402, 406, and 408 as described above, the sound may be preceded and/or followed by an (e.g. audible) indication that the text to be read or just read is associated with an element which is selectable, to thus convey to the user that the text that is audibly rendered is associated with a selector element. E.g. the indication may be "The following is presented on a selector element", and/or the indication may be a chime(s) or tone(s) (e.g. set by the user to be associated with the audible rendering of text of a selector element). In addition to or in lieu of the foregoing, such an indication (e.g. chime or tone) may also be provided while the text is being audibly rendered to similarly convey the existence of the text as being on a selector element.

Now describing FIG. 5, it shows an example settings UI 500 that may be presented on a device in accordance with present principles, from which one or more settings for undertaking present principles may be configured. Each option to be discussed below is understood to be associated with a check box as shown, where selection of the check box enables the function associated with the option. Thus, a first option 502 is presented to enable location mapping of sound based on where associated text is presented (e.g. to enable the providing of sound as giving the impression as originating from a location at which corresponding text is presented on a display, as described herein). A second option 504 is shown to enable gesture and voice selection of elements presented on the display in accordance with present principles.

The UI 500 also includes options 506 and 508, where option 506 is for configuring the device to map (e.g. provide) sound as coming from a location of a display at which its corresponding text is presented, while option 508 is for configuring the device to exaggerate the mimicked origin of sound for a given portion of text beyond the (e.g. surface) area of the front of the display itself.

Without reference to any particular figure, it may now be appreciated that e.g. sound processing techniques and/or algorithms can be used in accordance with present principles to produce binaural sound and/or sound localization as described herein. E.g., in some embodiments, monaural sound may first be derived from text presented on a display, and then the monaural sound may have X and Y coordinates applied to it (e.g. of a location on a plane established by the front of the display at which the corresponding text is presented) and/or the user's position applied as well, to render sound having the illusion of originating from the location of the text as presented on the display. In this way, e.g. a virtual "screen of sound" may be created parallel with if not coplanar with the plane established by the front of the display on which data is presentable.

Furthermore, present principles may be applied in instances where e.g. text may not necessarily be presented on a display but audio is being derived from text anyway, where a device may be programmed to e.g. draw the user's attention to certain areas in the field of view of the user based on various emulated origins of the sound. E.g., an airline pilot may have sound audibly rendered from text transmitted to the plane that indicates "a storm is approaching from the south," and accordingly the sound provided to the pilot will seem as if coming from a southern direction in which the storm is approaching.

It may now be appreciated that present principles provide for e.g. using binaural sounds, and/or otherwise adding distance and localization information, to synthesize sound derived from text. The present application provides a way to modulate synthesized sound derived from text e.g. on left and right speaker channels before and/or during playback to create an illusion of the origin of the sound being somewhere onscreen. For example, if the text being read is at the beginning of the page, the user will hear the voice above him. As the audible rendering of text continues, the voice will move downwards. If the text is indented, the corresponding audio will be heard e.g. slightly to the right of where other lines are represented as beginning. Accordingly, e.g. a visually impaired user can imagine the layout of the text presented on the display.

Moreover, present principles recognize that the foregoing may in some embodiments be integrated with a gesture recognizing system. For example, the user can raise his or her left hand to click a button that was read aloud as originating from in front and to the left of him.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular PROVIDING SOUND AS ORIGINATING FROM LOCATION OF DISPLAY AT WHICH CORRESPONDING TEXT IS PRESENTED is herein shown and described in detail, it is to be understood that the subject matter which is encompassed by the present application is limited only by the claims.

What is claimed is:

1. A device, comprising:
    a processor;
    a display accessible to the processor; and
    storage accessible to the processor and bearing instructions executable by the processor to:
    identify a location of a user;
    identify a direction from the location of the user to a location on the display on which at least a portion of text is presented;
    convert the portion of text to sound corresponding to the portion of text;
    based at least in part on the direction from the location of the user to the location on the display on which the portion of text is presented, modulate at least one audible output of at least one of at least two speakers to provide the sound corresponding to the portion of text presented on the display with at least one portion of the sound being provided as if originating at least substantially from the location on the display at which the portion of text is presented.

2. The device of claim 1, wherein the portion of text does not comprise all text presented on the display while the sound is provided.

3. The device of claim 1, wherein the location on the display on which the portion of text is presented is an area on the display on which text is presentable that is less than an entire area of the display on which text is presentable.

4. The device of claim 1, comprising a first speaker and a second speaker, and wherein the instructions are executable to:
modulate at least one audible output of the first speaker and the second speaker to provide the sound using the first speaker and the second speaker.

5. The device of claim 1, wherein the sound is binaural sound.

6. The device of claim 1, wherein the location of the user is one or more of: identified based on input from a proximity sensor on the device, identified based on input from a camera on the device, and identified based on location information received at the device.

7. The device of claim 1, wherein the instructions are executable to:
modulate at least one audible output of at least one of at least two speakers to provide the sound corresponding to the portion of text in an auditory sequence as the text would be read in sequence, wherein the sound varies as it is provided in the auditory sequence as if respective portions of the sound that are provided originate at least substantially from at least respective locations on the display at which respective text is presented on the display that corresponds to each respective portion of the sound that is provided.

8. The device of claim 7, wherein the instructions are executable to:
provide a first respective portion of the sound as if it originates from a first respective location on the display at which a beginning of a line of text is presented on the display which is indented relative to at least one other line of text that is not indented.

9. The first device of claim 1, wherein the at least one audible output is modulated by one or more of: modulating volume output level, modulating sound frequency, and modulating time that a given segment of the at least one portion of sound is provided at each of the two speakers.

10. The first device of claim 9, wherein the at least one audible output is modulated by modulating volume output level.

11. The first device of claim 9, wherein the at least one audible output is modulated by modulating sound frequency.

12. The first device of claim 9, wherein the at least one audible output is modulated by modulating time that a given segment of the at least one portion of sound is provided at each of the two speakers.

13. The first device of claim 1, wherein the instructions are executable by the processor to:
present an option on the display that is selectable to enable modulation of audible output based on user location to provide sound as if originating from respective locations on the display at which corresponding text is presented.

14. A method, comprising:
presenting text on a display of a device;
identifying a location of a user;
identifying a location of the display; and
presenting sound signals corresponding to respective portions of the text as coming from respective areas of the display at which the respective portions of the text are presented at least in part by modulating output of at least one of at least first and second speakers using the location of the user and the location of the display.

15. The method of claim 14, comprising:
converting the respective portions of the text to binaural sound signals and presenting the binaural sound signals at the first and second speakers.

16. The method of claim 14, wherein at least a first respective portion of the text is associated with a selector element presented on the display, and wherein the method comprises:
presenting sound signals corresponding to the first respective portion of the text as coming from a first respective area of the display at which the first respective portion of the text is presented at least partially on the selector element;
receiving input of a gesture directed to select the selector element; and
performing a function associated with selection of the selector element.

17. The method of claim 16, wherein the gesture is identified as a gesture in free space which comprises one or more of: a pointing of a finger, and a tapping motion.

18. An apparatus, comprising:
a first processor;
a network adapter; and
storage bearing instructions executable by a second processor for:
providing audio corresponding to a portion of text presented on a display accessible to the second processor, with at least a portion of the audio being provided by modulating output of at least one of at least first and second speakers using, as input, a location of a user to give the impression at the location of the user that the audio originates at least from a direction at least corresponding to an edge of the display closest to a location of the display at which the portion of the text is presented on the display;
wherein the first processor transfers the instructions over a network via the network adapter.

19. The apparatus of claim 18, wherein the instructions are executable to perform at least two of the following:
provide audio corresponding to a first portion of text presented on an upper portion of the display, relative to the display being looked by a user while the display is positioned upright, to give the impression the audio corresponding to the first portion originates from at least one of above the display and at the upper portion of the display at which the first portion of text is presented;
provide audio corresponding to a second portion of text presented on a lower portion of the display, relative to the display being looked by a user while the display is positioned upright, to give the impression the audio corresponding to the second portion originates from at least one of below the display and at the lower portion of the display at which the second portion of text is presented;
provide audio corresponding to a third portion of text presented on a left portion of the display, relative to the display being looked by a user while the display is positioned upright, to give the impression the audio corresponding to the third portion originates from at least one of to the left of the display and at the left portion of the display at which the third portion of text is presented; and
provide audio corresponding to a fourth portion of text presented on a right portion of the display, relative to the display being looked by a user while the display is positioned upright, to give the impression the audio corresponding to the fourth portion originates from at least one of to the right of the display and at the right portion of the display at which the fourth portion of text is presented.

20. The apparatus of claim 18, wherein the audio comprises binaural sound.

* * * * *